July 30, 1929. J. H. ROETHEL 1,722,825
ROOF VENTILATOR FOR CLOSED AUTOMOBILE BODIES
Filed March 29, 1927 3 Sheets-Sheet 1
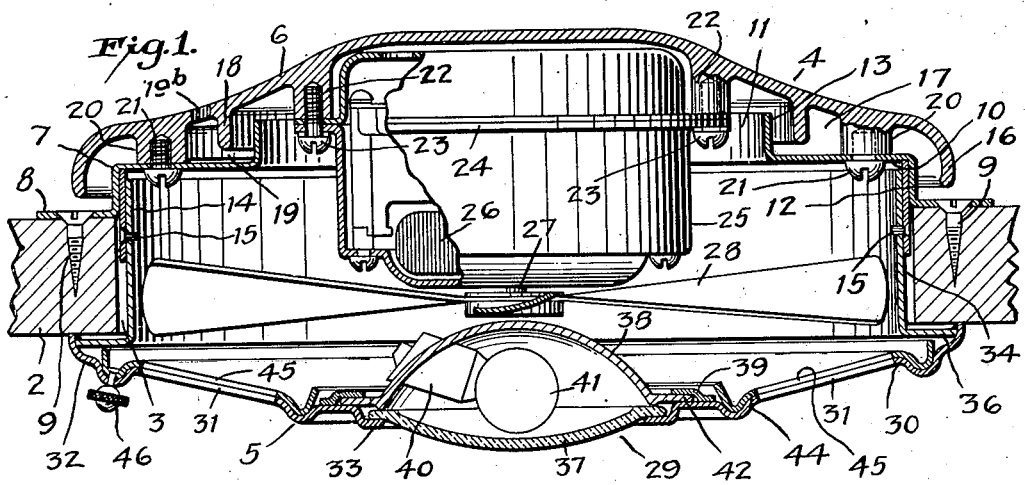
INVENTOR
John H. Roethel
BY
ATTORNEY July 30, 1929.  J. H. ROETHEL  1,722,825
ROOF VENTILATOR FOR CLOSED AUTOMOBILE BODIES
Filed March 29, 1927  3 Sheets-Sheet 2
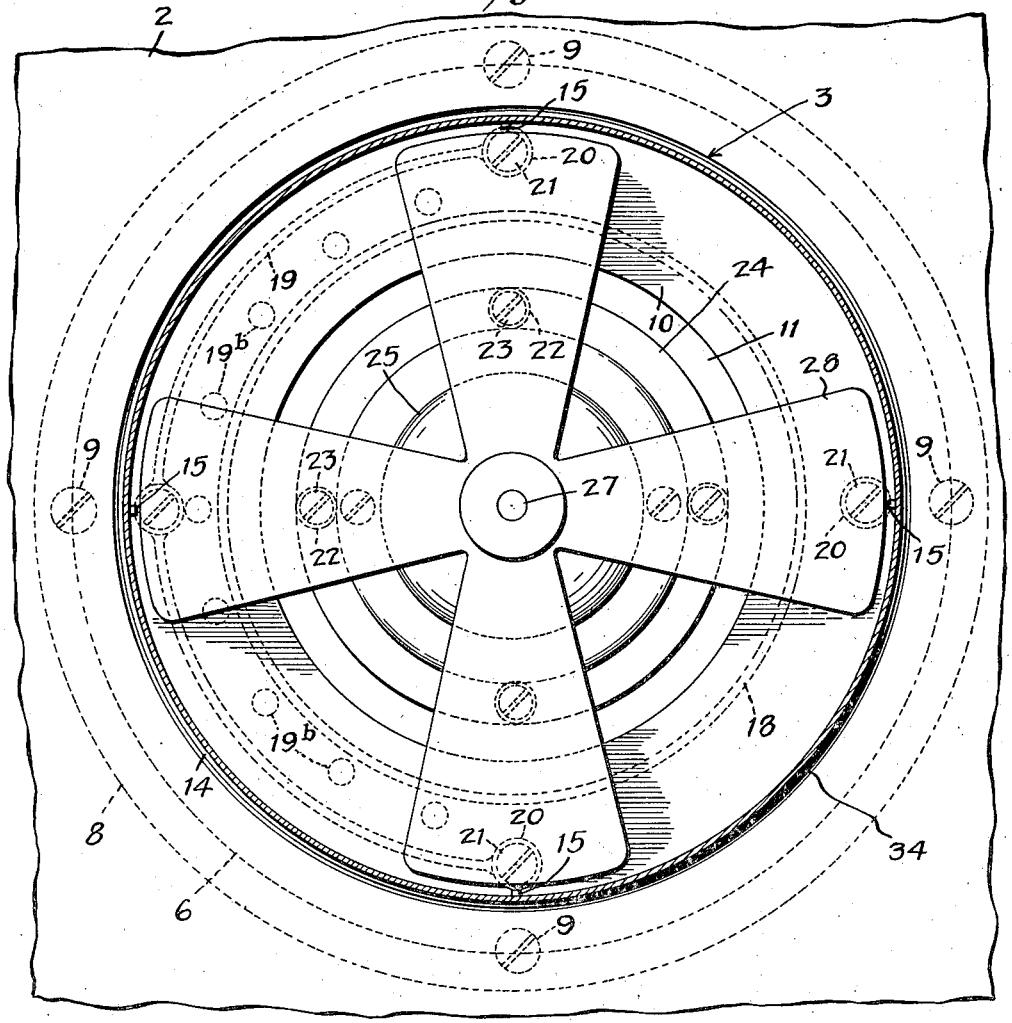
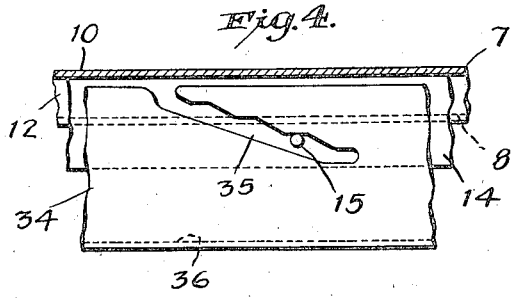
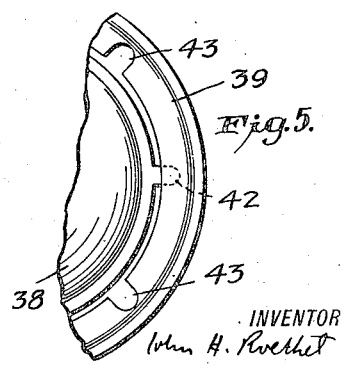
INVENTOR
John H. Roethel
BY
ATTORNEY July 30, 1929. J. H. ROETHEL 1,722,825
ROOF VENTILATOR FOR CLOSED AUTOMOBILE BODIES
Filed March 29, 1927   3 Sheets-Sheet 3
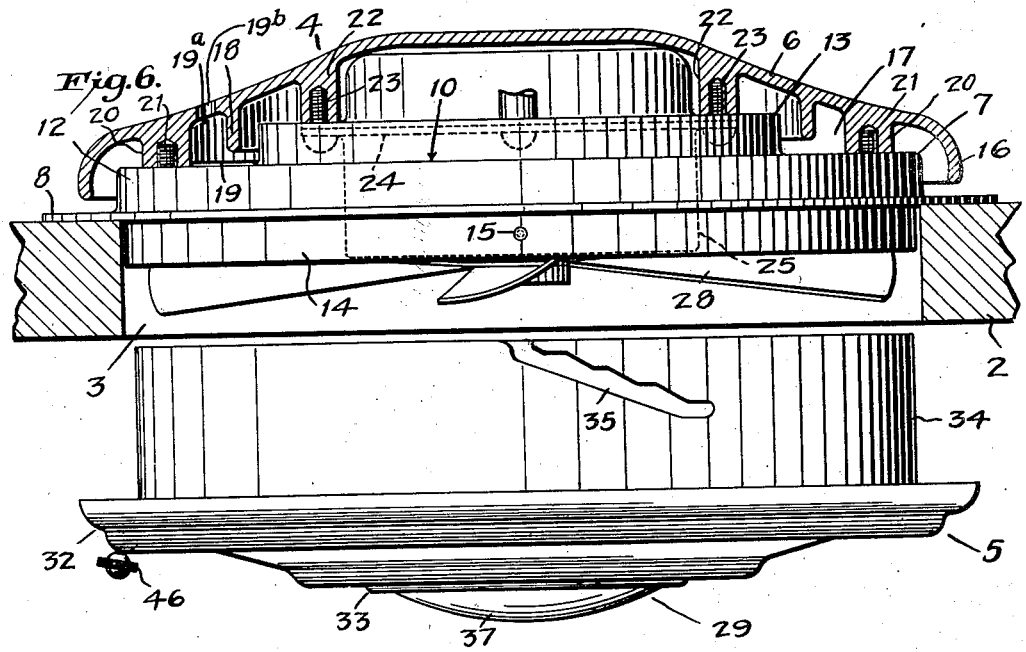
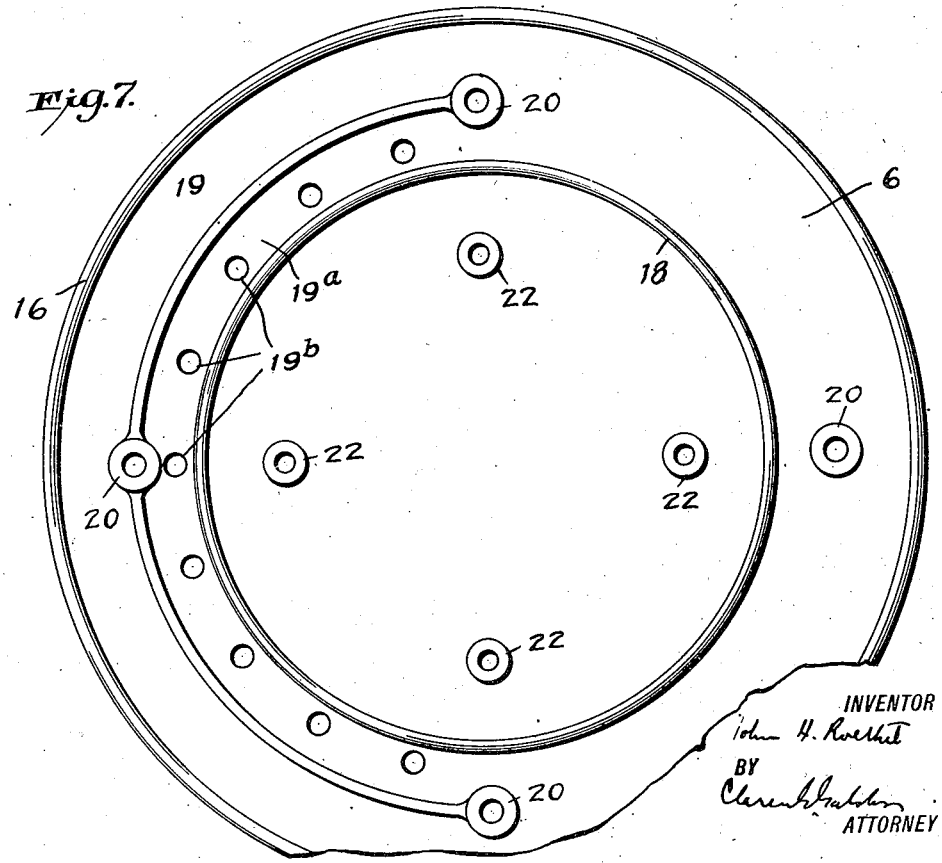
INVENTOR
John H. Roethel
BY
ATTORNEY Patented July 30, 1929.

1,722,825

UNITED STATES PATENT OFFICE.

JOHN H. ROETHEL, OF BROOKLYN, NEW YORK.

ROOF VENTILATOR FOR CLOSED AUTOMOBILE BODIES.

Application filed March 29, 1927. Serial No. 179,211.

The invention relates to roof ventilators for closed automobile bodies, and is more particularly an improvement upon the motor fan ventilator and dome light fixture disclosed in my prior application Serial No. 131,910, filed August 27, 1926.

The objects of the present improvements are to increase the efficiency of the device, to make it even more water-excluding, to eliminate interference by draft due to the motion of the car with the positive motor-controlled ventilation of the body, to increase the sturdiness and durability of the device, to facilitate installation, to provide for ready removability of the lower part of the device, to provide a connection for the lower part which is adjustable in respect to roof-thickness as well as being detachable, to secure great neatness of appearance, and to so construct the device that it may be economically manufactured. These and other objects and features of the invention will become apparent as the specification proceeds.

In the accompanying drawings forming part hereof:

Fig. 1 is a vertical, sectional view of the device installed in the roof of an automobile body, the motor and motor housing being in elevation, and a part of the latter broken away, the plane of the section being longitudinal with respect to the automobile, the front part of the ventilator being at the left of the view;

Fig. 2 is a bottom plan;

Fig. 3 is a horizontal section taken immediately beneath the roof, looking upward;

Figs. 4 and 5 are fragmentary detail views;

Fig. 6 is a view partly in vertical section and partly in elevation, showing the lower part or unit of the device detached from the upper unit which remains in place on the roof; and Fig. 7 is a bottom plan view of the dome casting.

The roof 2 of the automobile body has an opening 3 cut through it for the reception of the fixture.

The fixture comprises a top structure or unit 4 and a bottom cap or unit 5.

The ventilating top structure, which in my former application was made in a simple manner of one piece, is now advantageously made of a plurality of pieces, preferably two, namely the dome proper 6 consisting of a casting, and a stamped sheet metal underlying part or shell 7, which cooperate in a specially advantageous manner. The dome 6 is supported by the shell 7 in a moderately elevated position above the top of the roof, the structure covering and protecting the opening 3 and permitting ingress or egress of air.

The specific construction of the parts may be somewhat varied. In the embodiment illustrated the shell 7 is formed with a peripheral horizontal attaching flange 8, which seats on the top of the roof around the opening 3 and is suitably secured by screws 9. Inwardly of the attaching means there is an apron or upwardly facing surface 10 of broad annular form, extending inward over the roof opening 3 and surrounding an interior opening 11 of smaller diameter than the chamber within the roof opening 3, with which chamber said opening 11 communicates. At the outer edge of the apron there is a descending wall 12, which raises the apron above the top of the roof and which is preferably in one piece with the apron and the attaching flange 8. At the inner edge of the apron, encircling the opening 11, there is an upstanding wall 13, constituting a curb and a baffle, preferably formed by bending up the sheet metal of which these parts are made.

An extension piece or ring 14 soldered or otherwise secured within the wall 12 extends down into the opening 3 adjacent the circumference thereof and is provided at opposite points with inwardly projecting pins 15. The purpose of this extension and its pins will presently appear.

The dome proper 6 has a peripheral skirt 16 which depends outside of the wall 12, spaced therefrom, and terminating considerably below the top of said wall and adjacent but spaced from the horizontal surface of the flange 8 or the top of the roof. In this way a bend is formed at the outer side of the air passage or space 17 between the dome proper 6 and the apron 10, so that air in order to enter must pass beneath the edge of the skirt 16, then turn upward in the space between the baffles formed by said skirt and the wall 12, and then turn inward again over the apron. In this way rain or snow or flying particles are substantially excluded; but as a further protection another bend is contrived at the inner part of the air passage, this bend being formed by the curb wall 13 in cooperation with a depending circular rib 18 on the under side of the casting 6, this rib being spaced a short distance outwardly from the wall 13 and descending considerably below the top of said wall into narrowly spaced proximity to the apron. Therefore, air in order to enter the main chamber of the ventilator from the upper passages must pass beneath the edge of the rib or baffle 18, then up between the baffles 18 and 13, and then inward and downward through the opening 11.

In the front half, more or less, the dome 6 is formed with an approximately semi-circular rib 19, outside of the circular rib 18, this rib 19 extending down to meet the apron 10. Thereby a barrier is formed in the forward part of the ventilator top so as to prevent air or rain sweeping in at this region when the car is in motion. This is important both for exclusion of rain, snow and dust and to avoid conflict between natural draft and the desired fan draft. The channel 19$^a$ behind the barrier rib 19 is open at the rear, however, and in order to insure ample inlet or outlet, a number of holes 19$^b$ are preferably formed through the top of the dome into this channel or space, the apron extending beneath such holes.

A number of bosses 20 on the under side of the casting 6, outside the rib 18, rest on top of the supporting shell 7 and serve for connection of the parts in spaced relation by means of screws 21 which are passed upward through holes in the shell into tapped openings in the bosses.

Other bosses 22 on the under side of the dome, inwardly of the rib 18 and of the opening 11 in the member 7, receive screws 23 which pass through the flanges 24 of a two-part motor-housing 25, securing the latter, and the electric motor 26 which it contains and supports, solidly to the top structure. The motor extends above the top line of the roof, and is received partly within the dome and partly within the upper part of the roof opening, as in my prior application aforesaid.

The motor housing extends down through the opening 11 in the shell 6, spaced from the sides of said opening, into the interior chamber of the fixture, and the lower end of the armature shaft 27, which projects through a hole in the bottom of the motor housing, carries the fan 28, the fan being within the lower part of the roof opening, above, or mainly above, the bottom line of the roof, also as in my earlier application.

In that application the motor housing was also supported from the dome or top structure, and the armature and fan shaft had an upper bearing or support in the housing, but a lower bearing for the shaft was arranged on the ventilating and light-carrying cap which covered the bottom of the roof opening. One of the present improvements is that the motor, shaft and fan are wholly supported from the top structure, from which they depend, these parts forming a unit as seen in Fig. 6. This plan affords better support for the motor, makes installation easier, and permits the bottom cap 5, now relieved of all duty in connection with the support of the motor and fan, to be made in a wide span of comparatively light construction and of very neat appearance. The dome light 29 carried in the center of this cap is free of any directly transmitted vibration from the motor and fan. Furthermore, the bottom cap with its light are now made quickly detachable and attachable from below, permanent fastening of this part to the roof of the car being dispensed with.

The cap 5 is made of a diameter to overlap the bottom of the roof opening 3, and is dished, its intermediate portion 30, provided with radial ventilating slots 31, sloping gently downward from the outer margin 32 to the inner margin 33, the latter surrounding an opening in which the light 29 is received. A cylindrical supporting shell 34, or other suitable member, is united to the outer portion of the cap 5 and extends upward within the opening 3 to overlap or telescope with the extension 14 of the top structure, said shell being formed with bayonet slots 35 to cooperate with the pins 15, so that by turning the bottom cap and light unit and moving it up or down the said unit is applied or removed, as the case may be. By constructing the bayonet slots 35 of stepped formation, the bottom unit is made vertically adjustable for somewhat varying thicknesses of roofs. At its lower end the shell 34 has an out-turned flange 36, extending outwardly beneath the top of the roof around the opening 3 for connection with the edge of the cap 5.

The glass 37 of the light 29 rests on the inner edge of the cap 5, and a reflector housing 38 also rests on this region and is retained by a ring 39. The socket 40 of an electric lamp 41 is supported in an opening in the reflector housing, and is connected by wiring, not shown, with a suitably located switch. The reflector housing is made detachable from the bottom ventilator cap to permit removal and replacement of the lamp, this being accomplished in a simple and advantageous manner by providing the rim of the housing with tongues 42 which can be passed through notches 43 in the retaining ring 39, after which a partial turn locks the tongues under the ring.

An annular shutter 44 rests on top of the cap plate 5, its outer portion lying beneath and being retained by the overhang of the flange 36. This shutter is provided with ventilating openings 45 adapted to register with the openings 31 of the cap, and with solid portions between its slots adapted to blank the slots in the fixed plate when the shutter is turned to one of its limiting positions by a handle 46, which extends downward through a slot 47 in the fixed plate.

The fan motor is of the reversible type, and it will be understood that it is connected by suitable wiring with a switch.

While the preferred embodiment of the invention has been described in detail, it will be understood that the invention is not limited to the precise form and that various changes are permissible.

I claim:

1. A ventilating device for the roof of an automobile body which is provided with an opening through it, said device comprising a low upper unit adapted to cover the opening in the roof and carrying wholly suspended from it an electric motor, shaft and fan, a ventilating cap to cover the bottom of the roof opening, a shell united to and extending upward from said cap outside of the fan, and means of detachable connection between said shell and the upper unit.

2. A ventilating device for the roof of an automobile body which is provided with an opening through it, said device comprising an upper unit adapted to cover the opening in the roof and carrying wholly suspended from it a motor, shaft and fan, an extension on the under part of the upper unit adapted to extend down within the roof opening, a ventilating cap to cover the bottom of the roof opening, a shell united to and extending upward from said cap to telescope with said extension, and stepped bayonet joint connections between said shell and extension.

3. A ventilating device for the roof of an automobile body which is provided with an opening through it, said device comprising a low upper unit covering the opening in the roof and carrying wholly suspended from it an electric motor, shaft and fan, and a ventilating cap adapted to cover the bottom of said opening, and means of vertically adjustable connection between said cap and the upper unit.

4. A ventilating device for the roof of an automobile body which is provided with an opening through it, said device comprising a ventilating dome to cover the roof opening and having a support for a fan motor beneath it, a separate supporting shell having an outer roof flange and a portion to extend inward over the roof opening, and projections on the under side of said dome connected to said inwardly extending portion of the shell.

5. A ventilating device for the roof of an automobile body which is provided with an opening through it, said device comprising a ventilating dome to cover the roof opening and having a support for a fan motor beneath it, a separate supporting shell having an attaching portion, a raised apron and a wall descending from the outer edge of said apron, the apron extending inward beneath the dome, and the dome having a skirt depending outside of said wall to provide a guarded mouth.

6. A ventilating device for the roof of an automobile body which is provided with an opening through it, said device comprising a top structure to cover over the roof opening, said top structure providing circuitous passage for air beneath it and having a barrier in the front half, the barrier being omitted in the rear half.

7. A ventilating device for the roof of an automobile body which is provided with an opening through it, said device comprising a top structure to cover over the roof opening, said structure including a dome and an underlying part having an interior opening, said dome and underlying part having baffles providing circuitous passage for the air, and a barrier in the front half with a channel behind said barrier communicating with the circuitous passageway in the rear half.

8. A ventilating device for the roof of an automobile body which is provided with an opening through it, said device comprising a top structure to cover over the roof opening, said structure including a dome and an underlying part having an interior opening, said dome and underlying part having baffles providing circuitous passage for the air, and a barrier in the front half with a channel behind said barrier communicating with the circuitous passageway in the rear half, the dome having openings through its top into said channel behind the barrier.

9. A ventilating device for the roof of an automobile body which is provided with an opening through it, said device comprising a top structure to cover over the roof opening, said structure including a dome and an underlying part having an interior opening with a curb rising around said opening, said dome having a skirt depending outside the underlying part, an inner depending rib adjacent said curb and spaced from said underlying part, and an approximately semi-circular rib in the front half between said skirt and inner rib, meeting the underlying part to form a barrier.

JOHN H. ROETHEL.